US010024947B2

(12) United States Patent
Kieffer et al.

(10) Patent No.: US 10,024,947 B2
(45) Date of Patent: Jul. 17, 2018

(54) GPS ASSISTED TORPEDO RECOVERY SYSTEM

(71) Applicant: Adaptive Methods, Inc., Rockville, MD (US)

(72) Inventors: Kevin Kieffer, Washington, DC (US); Walter Allensworth, Poolesville, MD (US); Conrad Zeglin, Rockville, MD (US); James Wiggins, Thurmont, MD (US); Peter Owen, Monrovia, MD (US); Jeffrey Herdman, Bethesda, MD (US)

(73) Assignee: Adaptive Methods, Inc., Rockville, MD (US)

( * ) Notice: Subject to any disclaimer, the term of this patent is extended or adjusted under 35 U.S.C. 154(b) by 441 days.

(21) Appl. No.: 14/938,942

(22) Filed: Nov. 12, 2015

(65) Prior Publication Data

US 2016/0116563 A1  Apr. 28, 2016

Related U.S. Application Data

(63) Continuation of application No. 13/563,268, filed on Jul. 31, 2012, now Pat. No. 9,213,077.

(51) Int. Cl.
*G01S 1/68* (2006.01)
*G01S 1/72* (2006.01)
(Continued)

(52) U.S. Cl.
CPC .............. *G01S 1/68* (2013.01); *B63B 22/00* (2013.01); *B63C 7/26* (2013.01); *G01S 1/72* (2013.01); *G01S 1/725* (2013.01); *G01S 19/18* (2013.01); *B63B 2201/16* (2013.01); *B63B 2201/18* (2013.01); *B63B 2201/20* (2013.01)

(58) Field of Classification Search
CPC ... G01S 1/68; G01S 1/72; G01S 1/725; G01S 19/18; B63B 22/00; B63B 2201/16; B63B 2201/18; B63B 2201/20; B63C 7/26
See application file for complete search history.

(56) References Cited

U.S. PATENT DOCUMENTS

| 4,203,160 A | 5/1980 | Doherty |
| 5,119,341 A | 6/1992 | Youngberg |

(Continued)

*Primary Examiner* — Daniel Pihulic
(74) *Attorney, Agent, or Firm* — Blank Rome LLP (57) ABSTRACT

A method of locating an underwater based system, the method including determining the underwater based system's geo-location, encoding the underwater based system's geo-location for RF transmission, encoding the underwater based system's geo-location for acoustic transmission, and transmitting RF and acoustic signals containing the encoded geo-location to a receiving station. A locator for locating an underwater based system including a buoy, a global positioning system having an antenna and a receiver, an RF transmission system including an antenna and a transmitter, an underwater acoustic transducer, and a locator control unit adapted to determine the underwater based system's geo-location, encode the underwater based system's geo-location for RF transmission, encode the underwater based system's geo-location for acoustic transmission, and transmit RF and underwater acoustic signals containing the encoded geo-location.

13 Claims, 7 Drawing Sheets

(51) Int. Cl.
  *G01S 19/18* (2010.01)
  *B63B 22/00* (2006.01)
  *B63C 7/26* (2006.01)

(56) References Cited

U.S. PATENT DOCUMENTS

| | | | |
|---|---|---|---|
| 5,319,376 A | 6/1994 | Eninger | |
| 5,570,323 A | 10/1996 | Prichard et al. | |
| 5,577,942 A | 11/1996 | Juselis | |
| 5,579,285 A | 11/1996 | Hubert | |
| 5,592,156 A | 1/1997 | James | |
| 6,058,071 A | 5/2000 | Woodall et al. | |
| 6,058,874 A | 5/2000 | Glenning et al. | |
| 6,130,859 A | 10/2000 | Sonnenschein et al. | |
| 6,220,168 B1 | 4/2001 | Woodall et al. | |
| 6,400,645 B1 | 6/2002 | Travor | |
| 6,600,695 B1 | 7/2003 | Nugent et al. | |
| 6,711,095 B1 | 3/2004 | Daniels | |
| 6,762,678 B2 | 7/2004 | Arens | |
| 6,813,218 B1 | 11/2004 | Antonelli et al. | |
| 7,102,532 B2 | 9/2006 | Hudson | |
| 7,310,286 B1 | 12/2007 | Jarvis et al. | |
| 7,362,653 B2 | 4/2008 | Green et al. | |
| 7,388,512 B1 | 6/2008 | Moorer, Jr. | |
| 7,460,011 B1 | 12/2008 | Liau et al. | |
| 7,642,919 B2 | 1/2010 | Leal et al. | |
| 7,650,208 B2 | 1/2010 | Basilico | |
| 7,826,794 B2 | 11/2010 | Rhodes et al. | |
| 7,877,059 B2 | 1/2011 | Rhodes et al. | |
| 7,969,822 B2 | 6/2011 | Basilico | |
| 8,045,919 B2 | 10/2011 | Rhodes et al. | |
| 8,054,712 B1 | 11/2011 | Kasper et al. | |
| 8,059,485 B2 | 11/2011 | Sato | |
| 9,213,077 B2 * | 12/2015 | Kieffer | G01S 19/18 |
| 2002/0149996 A1 | 10/2002 | Carreiro | |
| 2009/0107388 A1 * | 4/2009 | Crowell | B63C 7/26 |
| | | | 114/336 |
| 2009/0141591 A1 | 6/2009 | Basilico | |
| 2011/0096632 A1 | 4/2011 | Pearce et al. | |
| 2011/0141853 A1 | 6/2011 | Megdal et al. | |
| 2013/0233232 A1 * | 9/2013 | Crowell | B63C 7/26 |
| | | | 114/336 |
| 2015/0063071 A1 * | 3/2015 | Kieffer | G01S 19/18 |
| | | | 367/134 |
| 2016/0116563 A1 * | 4/2016 | Kieffer | G01S 19/18 |
| | | | 367/134 |

* cited by examiner

GPS ASSISTED TORPEDO RECOVERY SYSTEM

CROSS-REFERENCE TO RELATED APPLICATIONS

This application is a continuation of U.S. patent application Ser. No. 13/563,268, filed Jul. 31, 2012, the subject matter of which is incorporated in its entirety by reference herein.

This invention was made with government support under contract # N00024-11-C-4108 awarded by Naval Sea Systems Command. The government has certain rights in the invention.

FIELD OF THE INVENTION

The invention relates generally to communications apparatuses and, methods, and in particular to a water-based vehicle location system.

BACKGROUND OF THE INVENTION

Underwater vessels, such as unmanned underwater vehicles (UUVs) and torpedoes, are used in a variety of military applications, for example, surveillance, reconnaissance, navigation, and defense. Often, it is important to recover UUVs and torpedoes. For example, torpedoes are often deployed but not armed for a variety of military training or strategic purposes. After a UUV or a torpedo has completed its task, it is difficult to locate the underwater vessel because highly accurate global positioning system (GPS) location systems and radio frequency (RE) communications links are not available to underwater vessels. This makes the locating of an underwater vessel inaccurate resulting in a slow recovery and an increased likelihood the underwater vessel will be lost, damaged, or stolen.

Accordingly, there is a need and desire for an underwater vessel recovery method and system for providing accurate geo-location information to air, surface, and underwater stations thereby enabling the quick retrieval.

DETAILED DESCRIPTION OF THE INVENTION

In the following detailed description, reference is made to the accompanying drawings, which form a part hereof and illustrate specific embodiments that may be practiced. In the drawings, like reference numerals describe substantially similar components throughout the several views. These embodiments are described in sufficient detail to enable those skilled in the art to practice them, and it is to be understood that structural and logical changes may be made. The sequences of steps are not limited to those set forth herein and may be changed or reordered, with the exception of steps necessarily occurring in a certain order.

The problem of needing to accurately locate an underwater vessel is solved by providing an underwater vessel recovery system. As set forth herein, the recovery system and method provides accurate geo-location information to air, surface, and underwater stations. The system and method allow for the acquisition of accurate geo-location and synchronized time and is capable of simultaneous broadcast of both radio frequency (RF) and acoustic transmissions of the acquired geo-location, along with an underwater locator beacon. Disclosed embodiments include a recovery system to aid in recovering water-based vehicles, as well as methods to increase the speed at which water-based vehicles are located.

The various embodiments of the invention can be used to particular advantage in the context of underwater vehicles such as UUVs or torpedoes. Therefore, the following example embodiments are disclosed in the context of torpedo systems. However, it will be appreciated that those skilled in the art will be able to incorporate the invention into numerous other alternative systems that, while not shown or described herein, embody the principles of the invention. Such alternative systems may include, for example, manned surface vessels that require rescuing or locating, or tracking systems for buried or underwater equipment or people.

Figure 1:
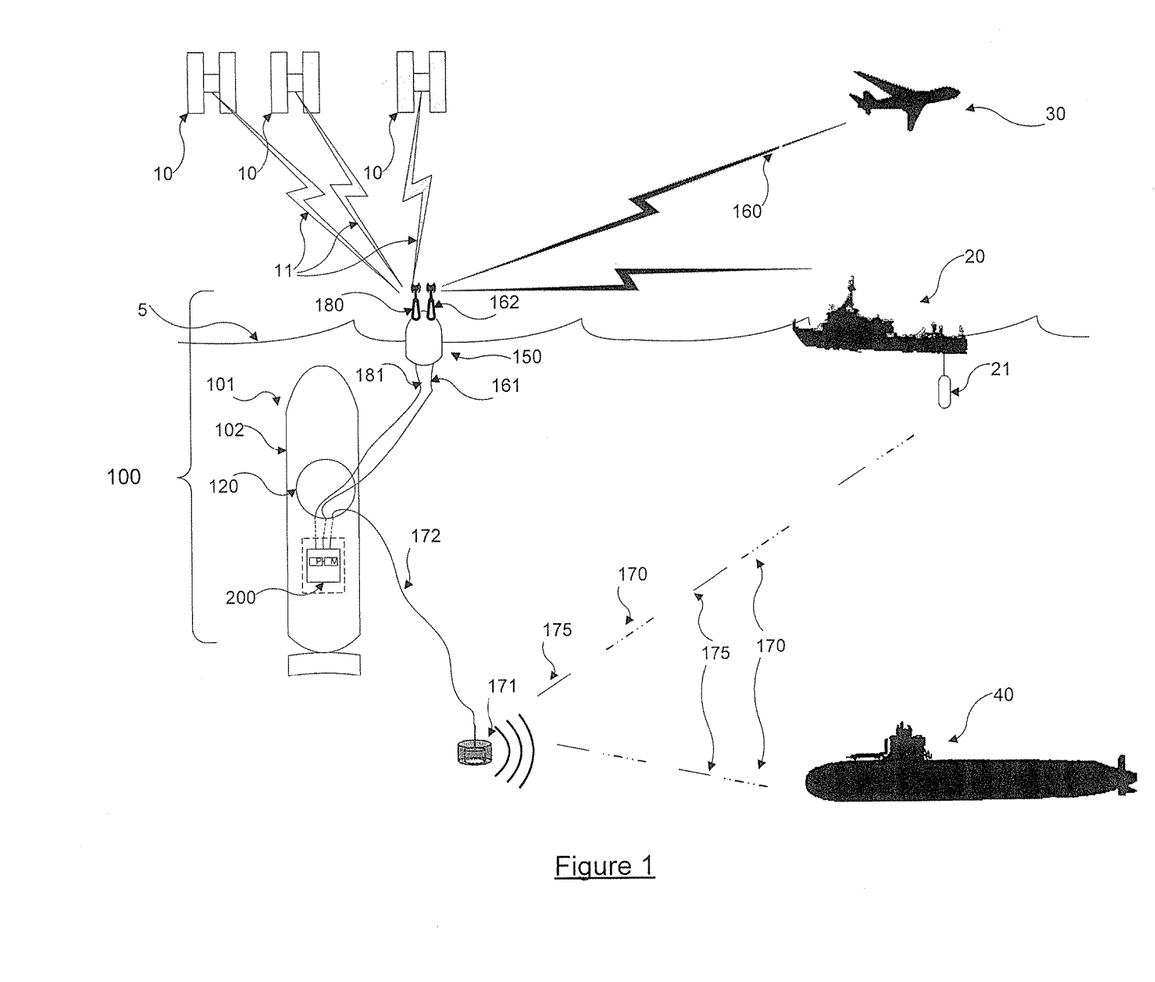
FIG. 1 is a schematic diagram of a recovery system in accordance with an embodiment described herein.
Figure 2:
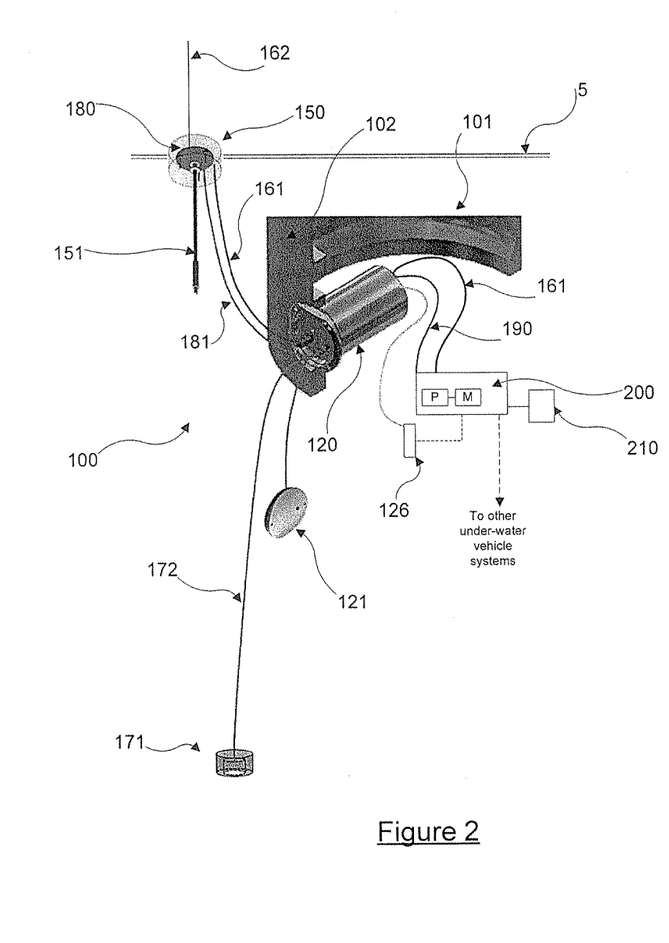
FIG. 2 is a schematic diagram of a recovery system in accordance with an embodiment described herein.

FIG. 1 shows an overview schematic of the recovery system 100 forming an embodiment of the present invention deployed from an underwater vehicle 101. As described above, one form of an underwater vehicle 101 can be a torpedo. The recovery system 100 includes a storage compartment 120 within the underwater vehicle 101 where various components of the recovery system 100 are stored when in a non-deployed state (not shown). The storage compartment 120 is of sufficient size such that all deployable components of the recovery system 100 can fit entirely within the underwater vehicle 101. The recovery system 100 includes a recovery control system 200 including a processor (P) connected to a memory (M). The recovery control system 200 is electrically connected to a float 150 via a GPS data cable 181 and an RF data cable 161, however, any conventional known suitable cable or connection can be used including, for example, single conductor, multi-conductor, or coaxial cables. The recovery control system 200 is also electrically connected to an acoustic projector 171 via acoustic data cable 172. Acoustic data cable 172 is preferably long enough (e.g., 20 feet) to ensure that acoustic projector 171 is deep enough to avoid face cavitation and improve coupling into the sound channel, as well as to ensure transmissions are not obstructed by underwater vehicle 101. The recovery control system 200 can also be electrically connected to other underwater vehicle power or control systems. For example, the recovery control system 200 can be configured to receive a low voltage logic signal, TTL, CMOS, or American National Standards Institute RS 422 standard signal. The recovery control system can be configured to be enabled or initiated by other underwater vehicle power or control systems. The recovery control system 200 is optimally located outside of the storage compartment 120 within the underwater vehicle 101 and protected from the water as shown in FIG. 2. or it may be located within the storage compartment 120 in a water tight enclosure.

With continuing reference to FIG. 1, the float 150 is constructed to be positively buoyant when deployed. The float 150 includes a radio frequency (RF) antenna 162 and a Global Positioning System (GPS) module 180. The RF antenna 162 and the GPS module 180 are above or partially above the water line 5 when in operation and at least one grounding post (not shown) may protrude into the water to conduct RF ground (not shown) to the water. The RF antenna 162 is electrically connected to the recovery control system 200 such that RF signals generated by the recovery control system 200 are transmitted through the RF data cable 161 and the RF antenna 162. The RF antenna 162 may be a very high frequency (VHF) antenna.

The GPS module 180 can be combined into a single antenna/receiver module located on or within float 150. In another example, the GPS module 180 can have an antenna located on float 150 and the GPS receiver can be contained within the recovery control system 200. The GPS module 180 is configured to receive GPS signals 11 from GPS satellite[s] 10 and acquire geo-location and time information based on the GPS signals 11. The GPS module is electrically connected to the recovery control system 200 via a GPS data cable 181 such that geo-location and time information are transmitted to the recovery control system 200 after acquisition.

The acoustic projector 171 is electrically connected to the recovery control system 200 and is of the type capable of translating electrical signals into underwater acoustic signals. Acoustic projector 171 can also be weighted to maintain it as deep and vertically oriented as possible. The acoustic projector 171 can be, for example, a free flooded, toroidal ring transducer. The acoustic projection can have, for example, an omni-directional response azimuthally but is vertically directive, that is, the power is focused more in the horizontal plane and falls off as the elevation is more orthogonal to the horizontal plane. The transducer can have a resonant frequency near or at the transmitting center frequency, for example a resonant frequency of 35 kHz and have a high transmitting voltage response, for example a response of 134 dB re uPa/V at one meter, however acoustic projectors 171 with other resonant frequencies and voltage responses may be used based on the transmission frequency and bandwidth used.

The recovery control system 200 is configured to receive geo-location and time information from the GPS module 180. In one embodiment, the GPS module 180 sends, and the recovery control system 200 receives geo-location and time information encoded as National Marine Electronics Association (NMEA) standard data via serial communication, although other protocols and interfaces to the recovery control system 200 can be used. In another example, the GPS module 180 receives raw GPS signal 11 via the GPS antenna and passes raw GPS signal 11 information to the recovery control system 200 which can be configured as a GPS receiver to translate raw GPS signal 11 information into geo-location and time information.

The recovery control system 200 is further configured to format the geo-location information and to transmit geo-location information via RF message 160 transmission and acoustic message 170 transmission. The RF message 160 is generated by the recovery control system 200 which may include a radio modem and radio transmitter such as a VHF radio transmitter (not shown) or other RF transmission generating components. In one embodiment, error detecting and correcting codes are added to the geo-location information, for example, checksum, cyclic-redundancy-check, or forward error correction codes can be added, however other error detecting and correcting codes may be used. In one embodiment, the RF message 160 is encrypted using, for example, the 128 bit AES-CTR algorithm before being transmitted by the recovery control system 200 via the RF data cable 161 and the RF antenna 162. For example, the carrier frequency is 154.57 or 154.60 MHz. However, other encryption algorithms and carrier frequencies may be used by the recovery control system 200. If desired, the RF message 160 could be transmitted un-encrypted. The RF message 160 transmission may be transmitted using binary phase-shift, or binary frequency shift keying; however any number of modulation schemes are possible.

The acoustic message 170 is generated by the recovery control system 200 which is configured to generate an analog acoustic message 170. In one embodiment, the acoustic message 170 is encoded. For example, the acoustic message 170 may be encoded using a frequency-hopping spread-spectrum (FHSS) technique. Acoustic message 170 is preferably encoded with a symbol set that has been chosen to be insensitive to multi-path interference. However, other modulation schemes may be used. In one embodiment, the recovery control system 200 may include an acoustic transmitter (not shown) to which the geo-location is sent and encoded. The acoustic transmitter can be configured to apply the modulation scheme to the digital signal, perform digital-to-analog conversion, and amplification. The output of the amplifiers can be applied to an impedance-matching circuit and the output of the impedance-matching circuit can be connected to the acoustic projector. An example of an acoustic transmitter is the United States Navy's MK-84 Mod 3 Acoustic transmitter.

The recovery control system 200 is further configured to generate and transmit a narrow band acoustic beacon signal 175 as an alternate method of locating the underwater vehicle 101 to the wider band acoustic message 170 signals. The narrow band acoustic beacon signal 175 does not contain geo-location information and is not encoded and therefore can be discriminated at a greater distance than the acoustic message 170. A surface station 20 or underwater station 40 may determine the bearing to the source of the signal 175 using a directional or multi-element hydrophone 21. In one embodiment, acoustic beacon 175 and acoustic message 170 signals are transmitted independent of each other. For example, the acoustic beacon 175 may be transmitted following the acoustic message 170, simultaneously with the acoustic message 170, or before the acoustic message 170.

Multiple receiving stations including airborne stations 30, surface stations 20, and underwater stations 40 may be configured to receive RF messages 160, acoustic messages 170 and acoustic beacons 175.

Figures 4A, 4B:
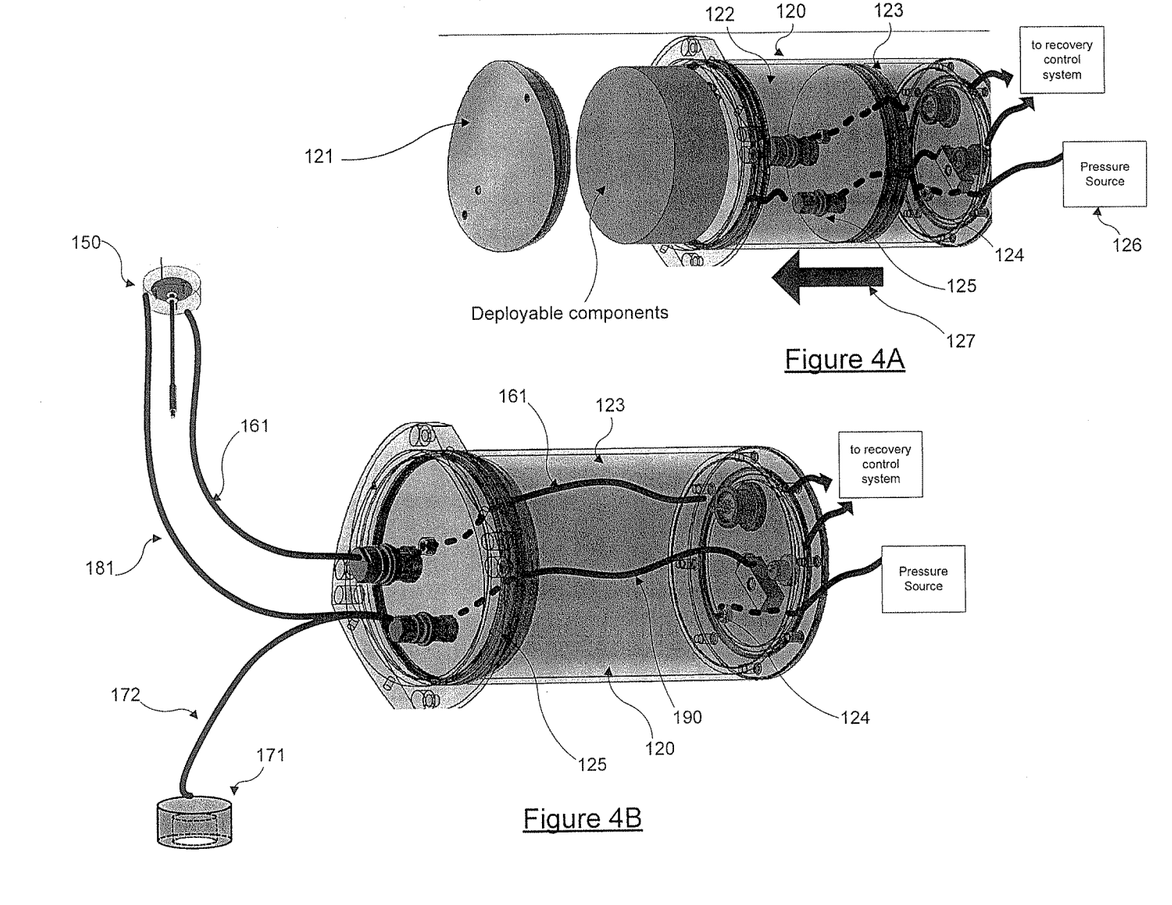
FIGS. 4A and 4B are perspective diagrams of a recovery system in accordance with an embodiment described herein.

FIG. 2. shows additional aspects of recovery system 100. Recovery control system 200 is located outside of storage compartment 120, but within underwater vehicle 101 where it is isolated from the water. The recovery control system 200 is electrically connected to battery 210 and to a pressure source 126. Pressure source 126 is mechanically coupled to storage compartment 120 such that pressure can be released into storage compartment 120. Recovery control system 200 may also be electrically connected to other underwater vehicle power or control systems. The recovery control system includes a pressure source 126 connected to the storage compartment 120. The storage compartment cover 121 is configured such that during deployment of the float 150 and acoustic projector 171, storage compartment cover 121 is removable. Other configurations of the storage compartment cover 121 are possible, such as a storage compartment cover that is hinged, or embedded on to the float 150, so long as the float 150 and acoustic projector 171 are deployable from within the storage compartment 120. Storage compartment cover 121 is shown tethered to storage compartment 120 to prevent loss. However, storage compartment cover 121 can also be untethered and unrecoverable as shown in FIG. 4A. Float 150 includes a stabilizer 151 to maintain the float in position such that the GPS module 180 and RF antenna 162 remain upright. In one embodiment, the stabilizer 151 includes interlocking rigid sections with a spring cord running inside them such that when deployed, the tension in the spring cord causes the stabilizer 151 sections to snap end to end and lock into place, forming a rigid post. Acoustic data cable 172 and GPS data cable 181 are shown as sub-cables of multi-conductor cable 190.

Figures 3A, 3B:
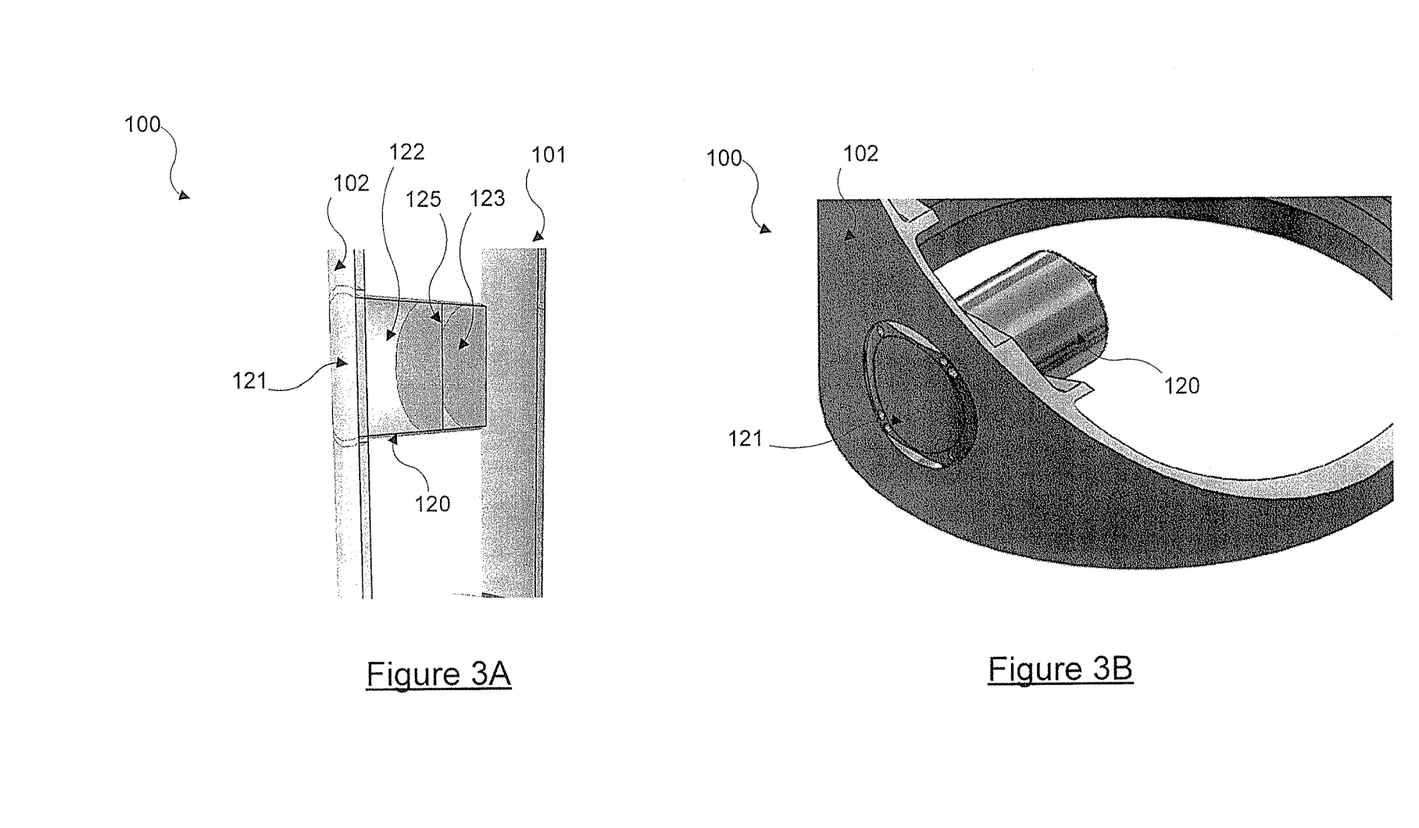
FIGS. 3A and 3B are schematic diagrams of portions of a recovery system in accordance with an embodiment described herein.

FIGS. 3A and 3B are cross-sectional schematics of underwater vehicle 101 and storage compartment 120 in an un-deployed state. Some components of underwater recovery system 100 are not shown. Storage compartment 120 has storage compartment cover 121 which has an external surface that conforms to the shape of the underwater vehicle hull 102 making a seamless integration within underwater vehicle 101 when in a not deployed state such as to minimize any drag forces on underwater vehicle 101 and minimize the possibility of entanglement as underwater vehicle 101 moves through the water. In one embodiment, shown in FIG. 3A, storage compartment 120 is subdivided into a deploying chamber 122 and a pressure chamber 123 and divided by a moveable piston 125 discussed below.

FIG. 4A shows a schematic representation of storage compartment 120 and recovery system 100 components during deployment. Deployable components, such as float 150, acoustic projector 171 and all associated data cables 161, 172, and 181 (not shown) are stored in storage compartment 120 when in an un-deployed state. Storage compartment cover 121 may be held in a non-deployed state by vacuum, electrical, or mechanical latch means configured to be released by the recovery control system 200. The deployable components are electrically connected to the recovery control system 200 through the piston 125 located in the storage compartment 120. The recovery control system 200 (FIG. 2) is configured to release pressure from the pressure source 126 into the pressure chamber 123 through a pressure port 124 and push the piston 125 in the direction of arrow 127 thereby expelling the deployable components out of the storage compartment 120 as shown in FIG. 4B. Acoustic projector 171 then sinks and float 150 floats to water line 5 (FIG. 1).

Figure 5:
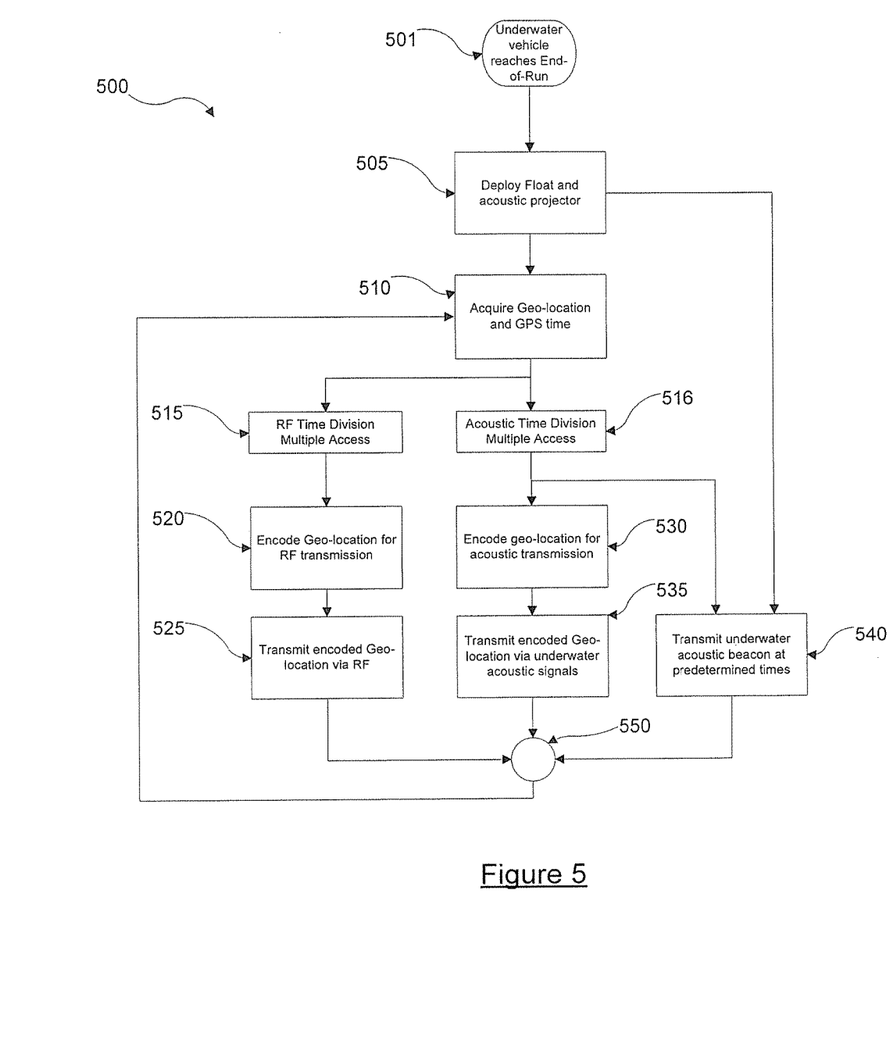
FIG. 5 is a is a logic flow diagram of a recovery method in accordance with an embodiment described herein.

FIG. 5 shows a method 500 for operating recovery system 100. At step 501 the underwater vehicle 101 satisfies the end-of-run criteria for triggering the recovery system 100. The end-of-run criteria will usually coincide with the underwater vehicle 101 shutting down its operational propulsion and the end-of-run signal may originate from within the recovery control system 200 or from other underwater vehicle 101 power or control systems, as discussed above. End-of-run criteria can include, for example, using a pressure transducer mounted in the compartment cover to ensure that the system has not armed prematurely and that it is sufficiently close to the water's surface to be operationally effective. Once the end-of-run criteria are met, the recovery control system 200 deploys the float 150 and acoustic projector 171 (as shown in FIG. 4B) at step 505. At step 510, the GPS module 180 will receive GPS signals 11 and determine the geo-location of the recovery system 100 in addition to a GPS based time. The geo-location and GPS based time are passed to the recovery control system 200, which updates, i.e. synchronizes, an internal system clock (not shown) with the GPS based time to ensure accuracy.

To allow for multiple underwater recovery systems 100 to communicate in the same operating location and frequency to the same receiving station, each RF message 160 and acoustic message 170 is delayed during a time division multiple access (TDMA) step, steps 515 and 516, respectively. Because the internal system clock is synchronized with the GPS based time, accuracy is ensured for the TDMA scheme. TDMA is described with respect to FIGS. 6 and 7 below.

At step 540 the recovery control system 200 transmits the acoustic beacon signal 175 via the acoustic projector 171 at predetermined times. Because the internal system clock has been updated, i.e. synchronized, with GPS based time and the acoustic beacon signal 175 is transmitted at predetermined times, a receiving station with GPS based time and with underwater acoustic monitoring capabilities knowing the predetermined times, such as an underwater station 40 (FIG. 1) or a surface station 20 (FIG. 1), can determine its range to the recovery system 100 based on the sound propagation delay through the water. The recovery control system 200 may also transmit the acoustic beacon 175 signal based on the non-updated recovery control system 200 internal system clock before the recovery control system 200 has acquired updated time from the GPS module 180. This allows for quick ranging and recovery after the float 150 and the acoustic projector 171 are deployed and also allows for recovery if the GPS module 180 is unable to acquire accurate GPS signals 10.

At step 520 the geo-location is encoded for RF transmission and at step 525 the encoded geo-location is transmitted via RF message 160 as discussed above with reference to FIG. 1. At step 530 the geo-location is encoded for acoustic transmission and at step 535, the encoded geo-location is transmitted via underwater acoustic message 160 as discussed above with reference to FIG. 1. Step 535 can occur either before, during, or after acoustic beacon 175 transmission at step 540. Further more, either underwater acoustic transmission step 535 or underwater acoustic beacon transmission step 540, or both, may occur simultaneously with RF transmission step 525. Because both acoustic and RF transmissions may occur simultaneously, the recovery system 100 may transmit its geo-location to a surface station 20 (FIG. 1), airborne station 30 (FIG. 1), and underwater station 40 (FIG. 1) simultaneously, thus increasing the speed at which the underwater vehicle 101 may be located. At step 550, the method is repeated back to step 510.

Figure 6:
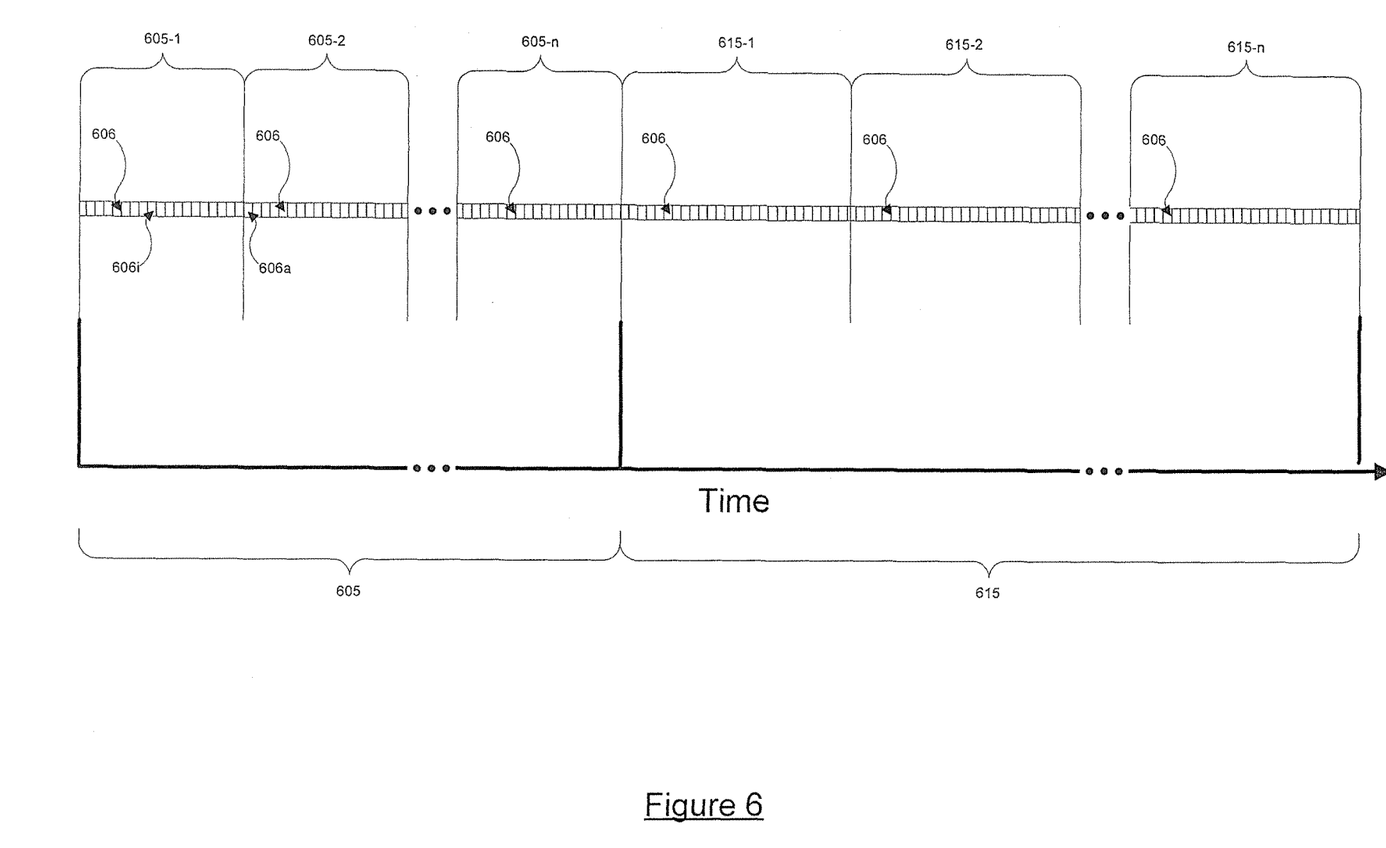
FIG. 6 is a schematic representation of a time division multiple access communications configuration in accordance with an embodiment described herein.

FIG. 6. shows one embodiment of a TDMA configuration discussed above with reference to method 500 and steps 515 and 516 (FIG. 5). The recovery control system 200 (FIG. 1) is configured with time epochs 605 and 615 within one of the TDMA configurations. Although only two time epochs are shown, it should be understood that recovery control system 200 may be configured with one or more time epochs, for example, one, two, three, four, or five time epochs. Time epochs 605 and 615 can be based on recovery system 100 internal system clock, i.e. predetermined times, or they can be based off of a relative time, such as end-of-run time.

Within time epoch 605, are multiple time periods 605-1, 605-2, . . . 605-$n$ of equal length. Each time period is subdivided into multiple time sub-periods 606 of equal length. Each time sub-period 606 is approximately equal to the message transmission length. For example, an RF TDMA time slice 606 may be approximately one third of one second and an acoustic TDMA time slice 606 may be approximately three seconds to allow for message transmission and for reverberations to die down. Each time sub-period 606 remains constant between time periods 605-1, 605-2, . . . 605-*n*, 615-1, 615-2, . . . 615-*n* and time epochs 605 and 615.

For any given time period 605-1, 605-2, . . . 605-*n*, the recovery control system 200 randomly selects one time sub-period 606 in which to transmit an RF 160 or acoustic 170 message. There is only one related transmission per time period 605-1, 605-2, . . . 605-*n*, however the time sub-period 606 selected for transmission may be different for each time period. For example, in time period 605-1, the transmission may occur in time sub-period 606*i*, whereas in time period 605-2, the transmission may occur in time sub-period 606*a*. The time periods 605-1, 605-2, . . . 605-*n* repeat until the end of time epoch 605.

At the end of time epoch 605, time epoch 615 begins containing multiple time periods 615-1, 615-2, . . . 615-*n* of equal length. The time periods 615-1, 615-2, . . . 615-*n* are of different length than time periods 605-1, 605-2, . . . 605-*n*. FIG. 6 shows time periods 615-1, 615-2, . . . 615-*n* are greater than time periods 605-1, 605-2, . . . 605-*n*. Similar to time epoch 605, the recovery control system randomly selects one time sub-period 606 within each time period 615-1, 615-2, . . . 615-*n* in which to transmit the related message. Because the time periods 615-1, 615-2, . . . 615-*n* are of greater length than the time periods 605-1, 605-2, . . . 605-*n*, the average time between transmissions is greater in time epoch 615 than in time epoch 605. Because the recovery system 100 is configured with multiple time epochs 605 and 615 with time periods of increasing length, the recovery system 100 is configured to transmit geo-location information more frequently immediately after underwater vessel 101 end-of-run. This enables the receipt of timely geo-location information enabling quicker recovery. However, if the underwater vehicle 100 is not recovered before the end of time epoch 605, the recovery system 100 is configured to increase the space between transmissions during time epoch 615 thereby reducing the overall power consumption and conserving system resources until the underwater vehicle 101 can be located. Time epochs subsequent to time epoch 615 can have even greater time periods than time period 615-*n*.

As discussed above, the recovery control system 200 can be configured to randomly select one time sub-period 606 in which to transmit an RF 160 or acoustic 170 message. Randomization has the advantage of not requiring multiple underwater vehicles 101 operating in the same location to be uniquely configured, however there is a small, but non-zero chance of message collision for every time period. In another embodiment, each recovery control system 200 can be configured to use the same time sub-period 606 in each time period 605-1, 605-2, . . . 605-*n*, and 615-1, 615-2, . . . 615-*n* different than the time sub-period 606 used by any other recovery control system 200 in the operating area, thus ensuring there are no message collisions.

Figure 7:
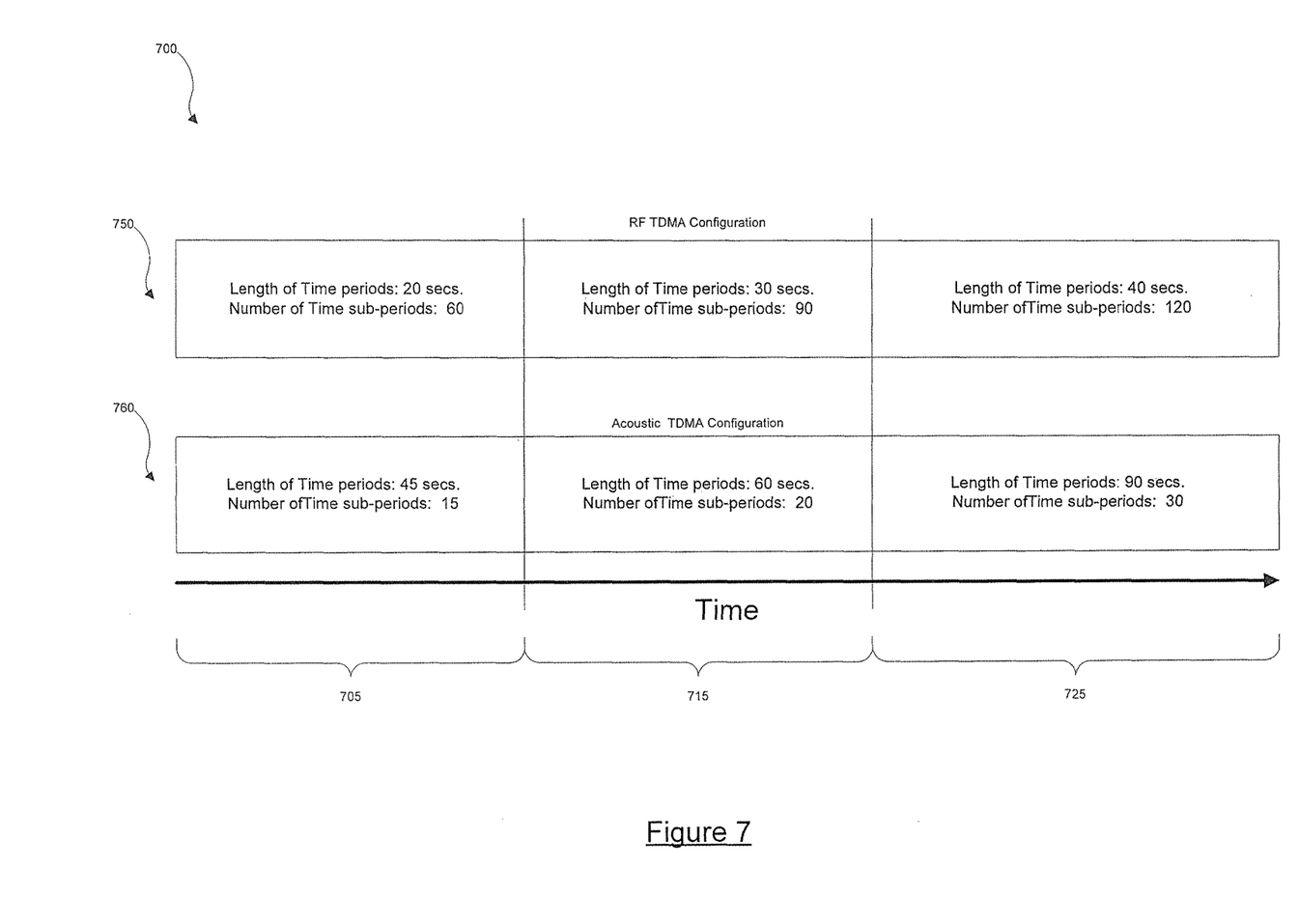
FIG. 7 is a schematic representation of a time division multiple access communications configuration in accordance with an embodiment described herein.

FIG. 7 shows an embodiment of a TDMA configuration 700 within the recovery control system 200 (FIG. 1). The recovery system 100 is configured to transmit acoustic signals 170, 175 simultaneously with RF message 160 signals, therefore the RF TDMA configuration 750 may be different than the acoustic TDMA configuration 760. The TDMA configuration 700 of FIG. 7 is configured with three time epochs 705, 715, and 725. Although time epochs 705, 715, and 725 for the RF TDMA configuration 750 and the acoustic TDMA configuration 760 are shown as equal, it should be understood that the RF and acoustic TDMA configurations 750, 760 may have time epochs 705, 715, and 725 independent from each other. Time epoch 705 is, for example, one hour long, time epoch 715 is, for example, one hour long, and time epoch 725, for example, continues until the underwater vehicle 101 is located.

As shown, the RF TDMA configuration 750 includes time epoch 705 configured with 20 second time periods each divided into 60 time sub-periods. Therefore, recovery control system 200 would randomly select one of the 60 time sub-periods within each 20 second time period to transmit the RF message 160. Time epoch 715 is configured with 30 second time periods each divided into 90 time sub-periods and time epoch 725 is configured with 40 second time periods each divided into 120 time sub-periods.

As shown, the acoustic TDMA configuration 760 includes time epoch 705 configured with 45 second time periods each divided into 15 time sub-periods. Therefore, recovery control system 200 would randomly select, or be configured to select, one of the 15 time sub-periods within each 45 second time period to transmit the acoustic message 170. Time epoch 715 is configured with 60 second time periods each divided into 20 time sub-periods and time epoch 725 is configured with 90 second time periods each divided into 30 time sub-periods.

The foregoing merely illustrate the principles of the invention. Although the invention may be used to particular advantage in the context of underwater vehicles, those skilled in the art will be able to incorporate the invention into other water based systems and passenger vessels. It will thus be appreciated that those skilled in the art will be able to devise numerous alternative arrangements that, while not shown or described herein, embody the principles of the invention and thus are within its spirit and scope.

What is claimed as new and desired to be protected by letters Patent of the United States is:

1. A locator system for a plurality of water based systems, the locator system comprising:
   a buoy for connecting to each respective water based system, including:
      a global positioning system (GPS) module having a GPS antenna and a receiver, and a radio frequency transmission system including an antenna and a transmitter;
   an underwater acoustic transducer for connecting to each respective water based system;
   a locator control system for each respective water based system comprising a processor which is adapted to communicate with the global positioning system module, the radio frequency transmission system, and the underwater acoustic transducer, the locator control system being configured to:
      determine its geo-location;
      encode its geo-location for radio frequency transmission;
      encode its geo-location for acoustic transmission;
      transmit radio frequency and underwater acoustic signals containing the encoded geo-location at a predetermined time, wherein the predetermined times for each of the plurality of water based systems are selected using a time-division multiple access scheme using a synchronized time received through the GPS; and
      repeat the determine, encode, and transmit steps after a predetermined time interval configured to increase over time; and a receiver configured to receive the radio frequency and/or acoustic signals containing the encoded geo-location for each of the plurality of water based systems and to decode each of the plurality of water based water based systems' geo-locations.

2. The locator system of claim 1, wherein each water based system is a torpedo and the determine, encode, and transmit steps are configured to be completed after each torpedo's end of run, respectively.

3. The locator of claim 1, wherein the locator control system is further configured to encrypt the water based system's geo-location before radio frequency or acoustic transmission occurs.

4. The locator system of claim 1, wherein the locator control system is further configured to transmit an acoustic beacon signal.

5. The locator of claim 3, wherein the locator control system is further configured to transmit the acoustic beacon signal at a predetermined time.

6. The locator of claim 1, wherein the radio frequency and acoustic signals containing the encoded geo-location are one-way transmissions.

7. The locator system of claim 1, wherein a time-division multiple access time slot for each of the plurality of water based systems is fixed for the transmission.

8. The locator system of claim 1, wherein a length of a time-division time slot associated with each radio frequency transmission is configured to contain the entire transmission plus a propagation time to a receiver.

9. The locator system of claim 1, wherein a length of a time-division time slot associated with each acoustic transmission is configured to contain the entire transmission plus a time for reflections of acoustic energy to dissipate.

10. A locator system for a plurality of water based systems, the locator system comprising:
    a tether for connecting to each respective water based system including:
        a global positioning system (GPS) antenna; and
        a radio frequency antenna;
    an underwater acoustic transducer for connecting to each respective water based system;
    a locator control system for each respective water based system comprising a processor which is adapted to communicate with the global positioning system antenna, the radio frequency antenna, and the underwater acoustic transducer, the locator control system being configured to:
        determine its geo-location;
        encode its geo-location for radio frequency transmission;
        encode its geo-location for acoustic transmission; and
        transmit radio frequency and underwater acoustic signals containing the encoded geo-location at a predetermined time, wherein the predetermined times for each of the plurality of water based systems are selected using a time-division multiple access scheme using a synchronized time, wherein a time-division multiple access time slot for each of the plurality of water based systems is selected randomly for the transmission; and
    a receiver configured to receive the radio frequency and/or acoustic signals containing the encoded geo-location for each of the plurality of water based systems and to decode each of the plurality of water based water based systems' geo-locations.

11. The locator system of claim 10, wherein the number of time slots are larger than the number of the plurality of water based systems to minimize the occurrence of a simultaneous transmission.

12. A locator system for a plurality of water based systems, the locator system comprising:
    a tether for connecting to each respective water based system including:
        a global positioning system (GPS) antenna; and
        a radio frequency antenna;
    an underwater acoustic transducer for connecting to each respective water based system;
    a locator control system for each respective water based system comprising a processor which is adapted to communicate with the global positioning system antenna, the radio frequency antenna, and the acoustic transducer, the locator control system being configured to:
        determine its geo-location;
        encode its geo-location for radio frequency transmission;
        encode its geo-location for acoustic transmission; and
        transmit radio frequency and underwater acoustic signals containing the encoded geo-location at a predetermined time, wherein the predetermined times for each of the plurality of water based systems are selected using a time-division multiple access scheme using a synchronized time, wherein the geo-location for each of the plurality of water based systems is encoded with error detecting and/or correcting codes; and
    a receiver configured to receive the radio frequency and/or acoustic signals containing the encoded geo-location for each of the plurality of water based systems and to decode each of the plurality of water based water based systems' geo-locations.

13. The locator system of claim 12 wherein the receiver is further configured to verify the geo-location to validate transmissions and/or encoded geo-location.

* * * * *